United States Patent [19]

Mowdood

[11] 3,926,910

[45] Dec. 16, 1975

[54] REDUCTION OF REACTOR FOULING AND IMPROVEMENT IN THE THERMAL STABILITY OF PVC USING NITRITES

[75] Inventor: Syed K. Mowdood, Akron, Ohio

[73] Assignee: The Goodyear Tire & Rubber Company, Akron, Ohio

[22] Filed: Aug. 16, 1974

[21] Appl. No.: 498,162

Related U.S. Application Data

[63] Continuation-in-part of Ser. No. 331,435, Feb. 12, 1973, abandoned.

[52] U.S. Cl.................. 260/45.95 C; 260/45.95 H; 260/45.95 S; 260/92.8 R; 260/92.8 W
[51] Int. Cl.$^2$........................................... C08K 5/05
[58] Field of Search.. 260/92.8 W, 92.8 R, 45.95 R, 260/45.95 H, 45.95 S

[56] References Cited
UNITED STATES PATENTS

| | | | |
|---|---|---|---|
| 3,225,108 | 12/1965 | Sturgis | 260/92.8 R |
| 3,691,080 | 9/1972 | Bauer et al. | 260/92.8 W |
| 3,812,086 | 5/1974 | Stack | 260/92.8 R |

FOREIGN PATENTS OR APPLICATIONS

| | | | |
|---|---|---|---|
| 900,970 | 7/1962 | United Kingdom | 260/92.8 |

*Primary Examiner*—Melvyn I. Marquis
*Attorney, Agent, or Firm*—F. W. Brunner; C. R. Schupbach; J. M. Wallace, Jr.

[57] ABSTRACT

Discloses preventing, inhibiting or reducing undesirable polymer build-up on reactor surfaces in touch with the reaction mixture during polymerization of vinyl monomer by introducing a nitrite into contact with the reactor surfaces prior to formation of resinous thermoplastic polymer. Shortstopping of free radical vinyl halide polymerization using nitrites both alone and in combination with phenolic anti-oxidants is also disclosed.

7 Claims, No Drawings

REDUCTION OF REACTOR FOULING AND IMPROVEMENT IN THE THERMAL STABILITY OF PVC USING NITRITES

This is a continuation-in-part of application Ser. No. 331,435 filed Feb. 12, 1973 now abandoned.

This invention relates to suppressing the growth of polymer on reactor surfaces in touch with the reaction medium resulting in reactor fouling by bringing an alkali or alkaline earth metal nitrite such as sodium-, potassium-, calcium-, or barium nitrite into the immediate vicinity of the reactor surfaces either by spraying a solution of the nitrite directly onto the surfaces or indirectly by adding the nitrite to the monomer.

It has been discovered that small amounts of nitrite between about 0.001 to less than 0.02 part, per 100 parts of monomer, will prevent reactor fouling or polymer build-up when introduced directly onto the reactor surfaces or indirectly by adding the nitrite to the monomer.

Sodium nitrite and alkali metal iodides have been used as a viscosity stabilizer for aqueous solutions of acrylamide polymers as shown in British Pat. No. 950,022. The presence of sodium nitrite in an emulsion of 2-chloro-1,3-butadiene or 2,3-dichloro 1,3-butadiene or their mixtures effectively inhibit premature polymerization of monomers as shown in British Pat. No. 900,970. Sodium nitrite has also been used to prevent formation of odoriferous sulfur dioxide during acid coagulation when sodium hydrosulfite and sodium hydroxide are used as a short stop for synthetic rubber emulsion polymerization as shown in British Pat. No. 976,896. It has also been shown that sodium nitrite is ineffective in the short stopping of butadienestyrene polymerization in "Synthetic Rubber" (Edited by G. S. Whitby), page 191, John Wiley & Sons, New York, 1954.

One would not be led to add sodium nitrite to a polymerization reaction at the beginning of the polymerization since it would interfere with the very purpose of the reaction, that is, to form polymer. Unexpectedly it has been discovered that when very small amounts of sodium nitrite are introduced into the immediate vicinity of the reactor surfaces and prior to formation of substantial amounts, less than 10 percent, of resinous thermoplastic polymer, little if any polymer build-up appears on the reactor surfaces. At the same time the thermal stability of the resulting polymer is improved.

The following examples illustrate the invention, all parts being by weight. Comparison of the reactor build-up was made by visual inspection and cleaning effort. Shortstopping efficiency was measured by the rate in drop of pressure. The heat stability of the resin was studied on a mill at 400° F.

| Example 1 (Control-Mass-No nitrite) | |
|---|---|
| Vinyl chloride (monomer) | 100.0 parts |
| Dicyclohexyl peroxydicarbonate (catalyst) | 0.065 parts |

The reactor was purged with nitrogen and then evacuated. The initiator and the monomer were then added to the reactor and the reaction started.

Polymerization pressure: Initial Pressure: 104 psi (7.312 kg/cm$^2$)

Termination of reaction at discharge pressure of 80 psi (5.624 kg/cm$^2$)

| Example 2 (Mass plus Nitrite) | |
|---|---|
| Vinyl chloride | 100.0 parts |
| Dicyclohexyl peroxydicarbonate | 0.065 part |
| Sodium nitrite | 0.010 part |
| Distilled water | 0.09 part |

The reactor was purged with nitrogen and then evacuated. Sodium nitrite solution was then sucked into the reactor. The initiator and the monomer were then added to the reactor and the reaction was started.

Polymerization pressure: Initial pressure: 105 psi (7.382 kg/cm$^2$)

Termination of reaction at discharge pressure of 75 psi (5.273 kg/cm$^2$)

| Example 3 (Mass plus Nitrite) | |
|---|---|
| Vinyl chloride | 100.0 parts |
| Dicyclohexyl peroxydicarbonate | 0.065 part |
| Sodium nitrite | 0.008 part |
| Distilled water - Ethanol (1:1 by weight) | 0.03 part |

Sodium nitrite was dissolved in a 50/50 waterethanol mixture. A portion (1/3) of the solution was used for coating the agitator. The reactor was then purged with nitrogen and evacuated. The remaining nitrite solution (2/3) was sucked into the evacuated reactor. The initiator and the monomer were then added and the reaction was started.

Polymerization pressure: Initial pressure: 106 psi (7.452 kg/cm$^2$)

Termination of reaction at discharge pressure of 91 psi (6.398 kg/cm$^2$)

| Example 4 (Suspension plus Nitrite) | |
|---|---|
| Vinyl chloride | 100.0 parts |
| Versene 100[1] | 0.05 part |
| Methocel 60HG-50[2] | 0.06 part |
| Gelvatol P13533[3] | 0.01 part |
| Lupersol 11 (75%)[4] | 0.10 part |
| Sodium nitrite | 0.008 part |
| Deionized water | 160.0 parts |
| Sodium nitrite | 0.2 part |

[1]Versene 100 = 40% aqueous solution of tetra sodium salt of ethylene diamine tetra acetic acid.
[2]Methocel 60HG-50 = Hydroxy propyl cellulose.
[3]Gelvatol P13533 = Polyvinyl alcohol.
[4]Lupersol 11 = Tertiary butyl peroxy pivalate (75% solution in mineral spirits).

Sodium nitrite (0.008 phr) was dissolved in water (0.11 phr) and added to a partially evacuated reactor followed by an aqueous solution containing Methocel, Gelvatol, and Versene. The reactor was then evacuated to remove air. Lupersol 11 and the monomer were then added to the reactor and the monomer was polymerized at 137° F. (58.3° C.). When the pressure dropped from 124 psi (8.7172) kg/cm$^2$) to 87.5 psi (6.15125 kg/cm$^2$), sodium nitrite (0.2 phr) was added to shortstop the reaction. After 30 minutes of its addition, the pressure dropped only 2.5 psi (0.1757 kg/cm$^2$). The reaction was discharged after 6 hours and 55 minutes.

The table below shows the values for reactor fouling and thermal stability of these examples.

| Ex. | Anti-fouling Agent | Reactor Fouling Amount of Antifouling Agent (PHM) | Reaction Time (hrs.) | Reactor Fouling Rating | Thermal Stability Degrade Time in mins. at 400°F. on Mill |
|---|---|---|---|---|---|
| 1 | None | — | 6.16 | D | 25.0 |
| 2 | NaNO$_2$ | 0.010 | 9.5 | A− | 34.75 |
| 3 | NaNO$_2$ | 0.008 | 9.0 | A− | 33.16 |
| 4 | NaNO$_2$ | 0.008 (.20 as shortstop) | 6.91 | A++ | 35.0 |

PHM = Parts per 100 parts of monomer
A++ = Substantially none
A+ = Slightly visible
A = Clearly visible
A− = Easily visible
B = All surfaces lightly covered
C = All surfaces covered
D = Heavy Buildup

Example 5

| | Parts |
|---|---|
| Vinyl chloride | 100.0 |
| Versene 100[1] | 0.05 |
| Methocel 60HG-50[2] | 0.01 |
| Lupersol 11 (75%)[4] | 0.10 |
| Distilled water | 160.0 |
| NaNO$_2$ (sodium nitrite) | 0.10 |
| 2,6 ditertiary butyl para cresol[5] | 0.10 |
| n-Hexane | 0.10 |

An aqueous solution containing Methocel, polyvinyl alcohol, and Versene was added to the reactor. The reactor was then purged with nitrogen and evacuated to remove traces of air. Lupersol 11 and the monomer was then added to the reactor and the reaction started with continuous agitation at 138° F. (58.8° C.).

When the pressure dropped from 126 psi (8.8578 kg/cm$^2$) to 83.5 psi (5.870 kg/cm$^2$), sodium nitrite (aqueous solution) and 2,6 ditertiary butyl para cresol solution (in hexane) were added to shortstop the reaction. After 38.0 minutes of its addition the pressure dropped to 81.6 psi (5.73648 kg/cm$^2$).

Inherent viscosity of the polymer = 0.895.

Pressure drop: 83.5 psi to 81.6 psi (1.9 psi or 0.133357 kg/cm$^2$) after addition of shortstop (time taken) = 38.0 minutes. (1), (2) and (4) same as described in Example 4. (5) - phenolic antioxidant.

From the foregoing table it is observed that during vinyl polymerization, undesirable polymer build-up is observed on the interior surfaces of the reactor resulting in costly cleaning operation with concomitant production lag when the nitrite of this invention is not used as shown in the control (Example 1). Use of an alkali metal nitrite reduces the reactor fouling and improves the heat stability of the vinyl polymer.

Fouling or build-up on the reactor walls is believed due to the affinity of the polymer for the interior surfaces of the reactor. In order to eliminate or reduce this problem, approaches to pacivate the interior surfaces have been made with varying degrees of success by polishing the surfaces of the reactor or coating these surfaces with fluorocarbon polymers, organic azo or azomethine compounds. Though elimination of the build-up is the desired goal, a reduction in the intensity of the build-up is nevertheless desirable.

As shown by the examples above, it has been discovered that the use of an alkali or alkaline earth metal nitrite reduces reactor build-up in addition to its beneficial effect on the heat stability of the resulting polymer containing commercial stabilizers.

Example 4 shows that nitrites alone act to shortstop vinyl monomer polymerizations. Nitrites are also quite effective when used with antioxidants as shortstops for vinyl halide polymerizations as shown in Example 5. Preferred antioxidants are phenolic antioxidants such as 2,6-di(1,1-dimethylbutyl)-p-cresol, 2,2'-methylene bis(4-methyl-6-t-butyl)phenol, 4-hydroxymethyl 2,6-di-t-butyl phenol, 4,4'-methylene bis(2,6-di-t-butyl phenol), 4,4'-thiobis(6-tert-butyl-o-cresol, mixtures of mono, di and tri styrenated phenols such as Wingstay S manufactured by The Goodyear Tire & Rubber Company and mixtures of butylated, styrenated meta cresols and para cresols such as Wingstay V manufactured by The Goodyear Tire & Rubber Company. Such materials can be used to shortstop mass, emulsion and suspension vinyl halide polymerizations.

These nitrites may be used in amounts from about 0.001 to about 1.0 part per hundred of monomer during mass, suspension or emulsion polymerization reaction of any monomer, i.e., vinyl chloride, polymerizable to a resinous thermoplastic polymer in the presence of a catalyst, generating free radicals. In suspension and emulsion polymerization, the interior surfaces of the reactor should be coated with nitrite prior to the addition of the aqueous phase and monomers. Alkali metal nitrite may be used in polymerization of vinyl chloride at a reaction temperature of from 75° F. (23.9° C.) to about 185° F. (85° C.) to reduce fouling of the reactor and yielding polymer of good heat stability.

Examples of monomers that will form resinous thermoplastic polymers beneficially aided by the nitrites of this invention besides vinyl chloride are all vinyl monomers such as (1) esters of unsaturated alcohols, e.g., allyl; 1-chloroallyl, 2-chloroallyl, (2) unsaturated acids, e.g., acrylic, methacrylic and other α-substituted acrylic acid, (3) unsaturated polybasic acids, e.g., maleic, fumaric, (4) esters of saturated alcohols with unsaturated aliphatic monobasic and polybasic acids, e.g., methyl acrylate, ethyl acrylate, 2-ethyl hexyl acrylate, methyl methacrylate and dibutyl maleate, etc., (5) vinyl cyclic componds including monovinyl aromatic hydrocarbon, e.g., styrene, chlorostyrenes (o, m & p), methyl styrene, etc., vinyl pyridine, divinyl benzene, N-vinyl pyrrolidone and N-vinyl carbazole, (6) unsaturated ethers (allyl or aryl vinyl ether), e.g., methyl vinyl ether, ethyl vinyl ether, butyl vinyl ether, cetyl vinyl ether and lauryl vinyl ether, etc., (7) unsaturated amides, e.g., acrylamide, diacetone acrylamide, (8) vinyl halides, e.g., vinyl fluoride, vinyl bromide, vinylidene chloride, allyl chloride, (9) unsaturated nitriles, e.g., acrylonitrile, methacrylonitrile, and α-chloro acrylonitrile. Other vinyl monomers are vinyl acetate, benzophenone glycidyl acrylate and methacrylate, hydroxy propyl acrylate, hydroxy ethyl acrylate, glycidyl acrylate, glycidyl methacrylate, vinyl stearate, vinyl propionate, propylene, isobutylene, ethylene, etc. The above monomers could be polymerized to yield homopolymers or copolymers with vinyl chloride and other monomers.

While certain representative embodiments and details have been shown for the purpose of illustrating the invention, it will be apparent to those skilled in this art that various changes and modifications may be made therein without departing from the spirit or scope of the invention.

I claim:

1. The process of making a resinous, thermoplastic polymer from a vinyl monomer polymerizable in a mass polymerization system to said polymer in a reactor which comprises adding from 0.001 to 1.00 part per 100 parts of monomer of an alkali or an alkaline earth metal nitrite at the reactor surface which is in contact with the reaction medium prior to formation of less than 10 percent of said polymer by weight from said monomer.

2. The process of claim 1 wherein the polymerization is catalyzed by a free radical initiation.

3. The process of claim 1 wherein the monomer is vinyl chloride.

4. The process of claim 1 wherein the alkali or alkaline earth metal nitrite is selected from the group consisting of sodium nitrite, potassium nitrite, barium nitrite and calcium nitrite.

5. The process of claim 1 wherein the vinyl monomer is vinyl chloride, sodium nitrite is supplied to the reactor surface in the amount of 0.008 part per 100 parts of monomer, then adding vinyl chloride to the reactor and polymerizing the monomer.

6. The process which comprises adding sodium nitrite as a shortstop to vinyl halide polymerization systems.

7. The process which comprises adding sodium nitrite in combination with phenolic antioxidants as a shortstop to vinyl halide polymerization systems.

* * * * *